(12) United States Patent
Dillenberger et al.

(10) Patent No.: US 8,027,817 B2
(45) Date of Patent: Sep. 27, 2011

(54) SIMULATION MANAGEMENT WITHIN A GRID INFRASTRUCTURE

(75) Inventors: Donna N. Dillenberger, Yorktown Heights, NY (US); Michael J. Osias, Westtown, NY (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 11/747,122

(22) Filed: May 10, 2007

(65) Prior Publication Data

US 2008/0282242 A1 Nov. 13, 2008

(51) Int. Cl.
*G06F 7/48* (2006.01)
(52) U.S. Cl. .............. 703/6; 709/224; 709/225
(58) Field of Classification Search .......... 709/202, 709/203, 224, 225; 717/126; 463/42; 703/6; 705/10

See application file for complete search history.

(56) References Cited

U.S. PATENT DOCUMENTS

| 7,171,470 | B2 | 1/2007 | Doyle et al. | |
|---|---|---|---|---|
| 2002/0103851 | A1* | 8/2002 | Kikinis | 709/202 |
| 2005/0027865 | A1* | 2/2005 | Bozak et al. | 709/226 |
| 2005/0125537 | A1* | 6/2005 | Martins et al. | 709/226 |
| 2006/0149842 | A1 | 6/2006 | Dawson et al. | |
| 2006/0150158 | A1* | 7/2006 | Fellenstein et al. | 717/126 |

OTHER PUBLICATIONS

Cao et al., GridFlow: Workflow Management for Grid Computing, IEEE Computer Society, pp. 198-205.*
Avellino et al., The DataGrid Workload Management System: Challenges and Results, Springer Netherlands, pp. 353-367.*
Li et al., A Grid Workflow-Based Monte Carlo Simulation Environment, Nov. 2003, pp. 1-16.*
Foster, "A Globus Primer Or, Everything You Wanted to Know about Globus, but Were Afraid To Ask," Draft of May 8, 2005, printed from http://www.globus.org/toolkit/docs/4.0/key/GT4_Primer_0.6.pdf on May 10, 2007, publication date unknown, pp. 1-69.
Kaufman et al., "OptimalGrid: The Almaden SmartGrid project—Autonomous optimization of distributed computing on the Grid," IEEE Technical Committee on Scalable Computing Newsletters, vol. 4, No. 2, 2002, pp. 1-10.
Kaufman et al., "OptimalGrid—autonomic computing on the Grid," IBM Developer Works, Jun. 2003, pp. 1-10.

* cited by examiner

*Primary Examiner* — Paul Rodriguez
*Assistant Examiner* — Bernard E Cothran
(74) *Attorney, Agent, or Firm* — William Scheisser; Hoffman Warnick LLC

(57) ABSTRACT

A solution for managing a set of simulations within a grid infrastructure is provided. In particular, a solution is provided in which distinct simulations (e.g., virtual worlds, distributed simulations, and/or the like) and/or simulation instances (e.g., virtual world instances) can be concurrently managed in a single grid infrastructure.

20 Claims, 3 Drawing Sheets

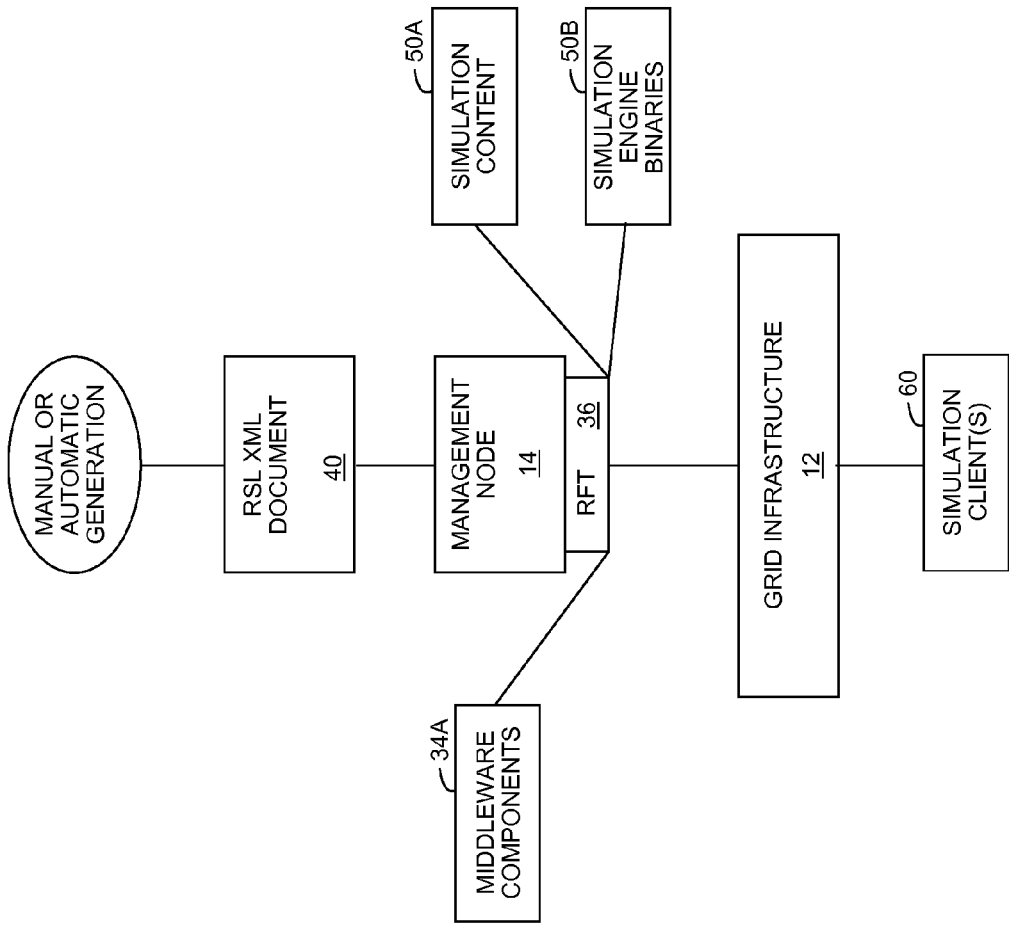

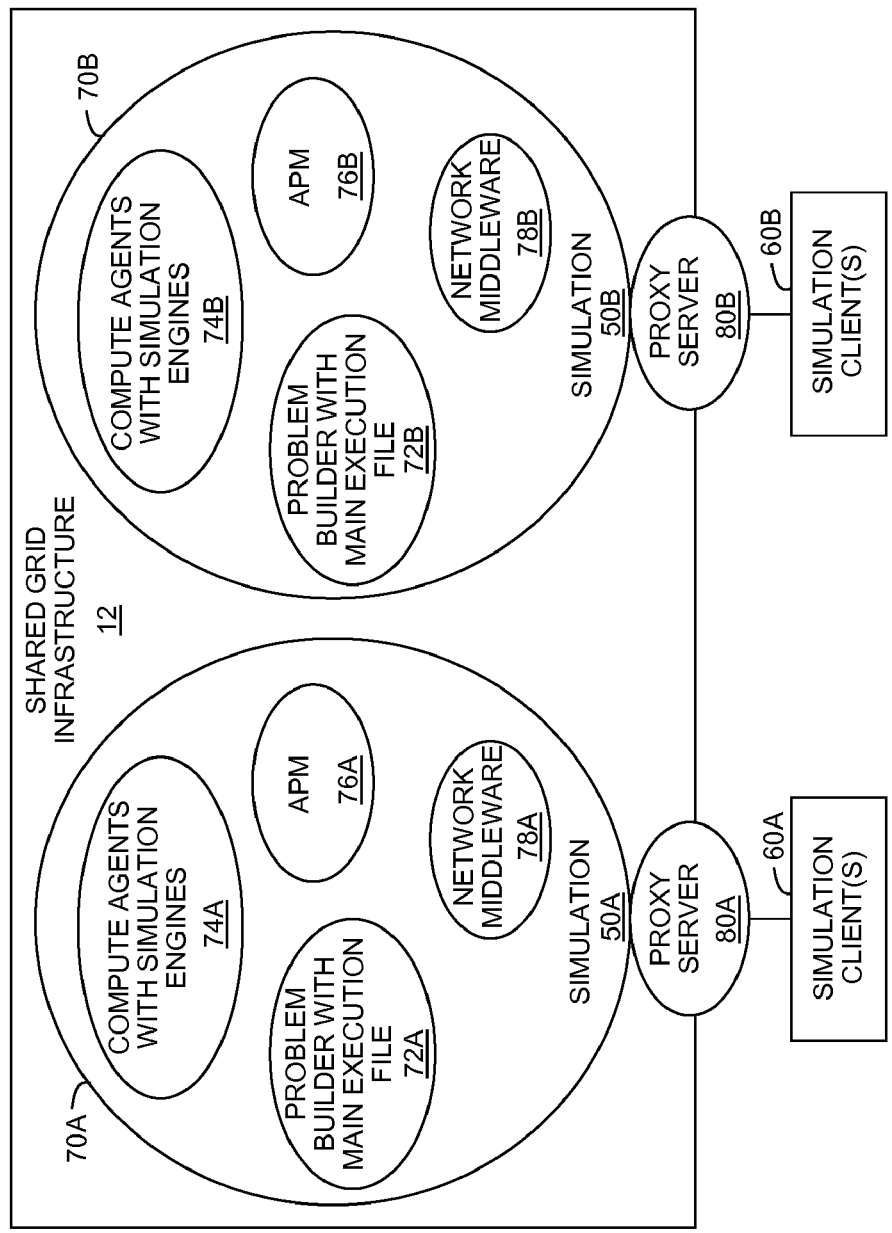

SIMULATION MANAGEMENT WITHIN A GRID INFRASTRUCTURE

FIELD OF THE INVENTION

Aspects of the invention relate generally to the management of simulations, such as virtual worlds, and more particularly, to a solution for managing the execution of one or more simulations in a single grid infrastructure.

BACKGROUND OF THE INVENTION

Currently, the management (e.g., deployment, administration, and/or the like) of concurrent, distinct simulations (e.g., virtual worlds, distributed simulations, and/or the like) requires either a dedicated grid infrastructure for each simulation, simulation type, or simulation instance (e.g., virtual world instance).

BRIEF SUMMARY OF THE INVENTION

Aspects of the invention provide a solution for managing a set of simulations within a grid infrastructure. In particular, a solution is provided in which distinct simulations (e.g., virtual worlds, distributed simulations, and/or the like) and/or simulation instances (e.g., virtual world instances) can be concurrently managed in a single grid infrastructure.

A first aspect of the invention provides a method of managing a set of simulations within a grid infrastructure, the method comprising: obtaining a simulation, the simulation comprising one of: a virtual world or a distributed simulation; creating a virtual grid infrastructure within the grid infrastructure for the simulation, the creating including: assigning a set of grid resources of the grid infrastructure to the simulation; deploying a set of middleware components to the assigned set of grid resources; and deploying a set of simulation elements for the simulation to the set of middleware components; and executing the set of simulation elements within the set of grid resources using the set of middleware components.

A second aspect of the invention provides a system for managing a set of simulations within a grid infrastructure, the system comprising: a system for obtaining a simulation, the simulation comprising one of: a virtual world or a distributed simulation; a system for creating a virtual grid infrastructure within the grid infrastructure for the simulation, the system for creating including: a system for assigning a set of grid resources of the grid infrastructure to the simulation; a system for deploying a set of middleware components to the assigned set of grid resources; and a system for deploying a set of simulation elements for the simulation to the set of middleware components; and a system for executing the set of simulation elements within the set of grid resources using the set of middleware components.

A third aspect of the invention provides a computer program comprising program code stored on a computer-readable medium, which when executed, enables a computer system to implement a method of managing a set of simulations within a grid infrastructure, the method comprising: obtaining a simulation, the simulation comprising one of: a virtual world or a distributed simulation; creating a virtual grid infrastructure within the grid infrastructure for the simulation, the creating including: assigning a set of grid resources of the grid infrastructure to the simulation; deploying a set of middleware components to the assigned set of grid resources; and deploying a set of simulation elements for the simulation to the set of middleware components; and executing the set of simulation elements within the set of grid resources using the set of middleware components.

A fourth aspect of the invention provides a method of generating a system for managing a set of simulations within a grid infrastructure, the method comprising: providing a computer system operable to: obtain a simulation, the simulation comprising one of: a virtual world or a distributed simulation; create a virtual grid infrastructure within the grid infrastructure for the simulation, the creating including: assigning a set of grid resources of the grid infrastructure to the simulation; deploying a set of middleware components to the assigned set of grid resources; and deploying a set of simulation elements for the simulation to the set of middleware components; and execute the set of simulation elements within the set of grid resources using the set of middleware components.

The various aspects of the invention can be implemented as part of a business method for managing simulation(s) in a grid infrastructure, in which payment is received in return for implementing, utilizing, and/or managing aspects of the invention.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention.

FIG. 2 shows an illustrative architecture for deploying simulation to the grid infrastructure of FIG. 1 according to an embodiment.

FIG. 3 shows an illustrative architecture for executing multiple simulations in the grid infrastructure of FIG. 1 according to an embodiment.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
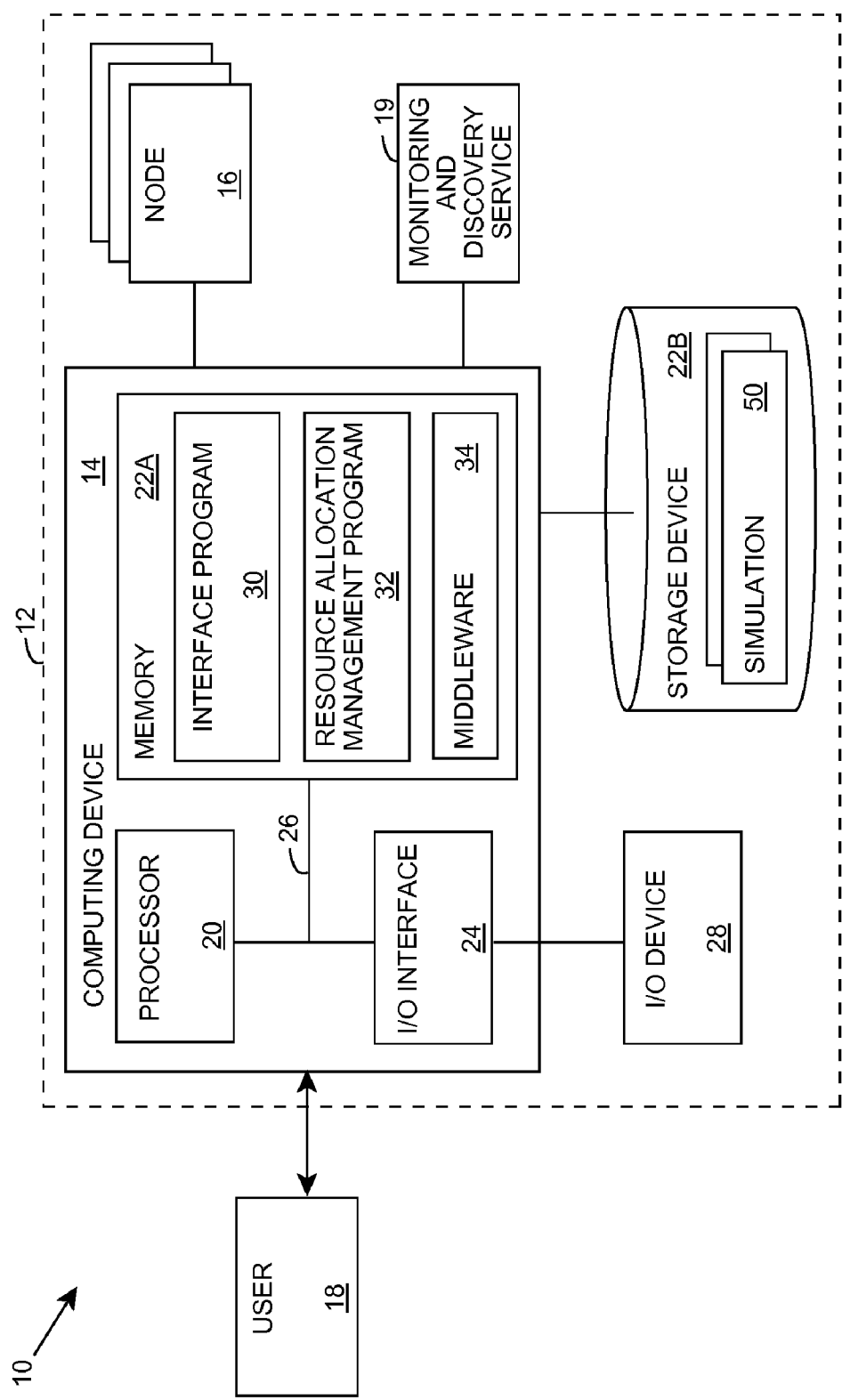
FIG. 1 shows an illustrative environment for managing a set of simulations according to an embodiment.

As indicated above, aspects of the invention provide a solution for managing a set of simulations within a grid infrastructure. In particular, a solution is provided in which distinct simulations (e.g., virtual worlds, distributed simulations, and/or the like) and/or simulation instances (e.g., virtual world instances) can be concurrently managed in a single grid infrastructure. As used herein, unless otherwise noted, the term "set" means one or more (i.e., at least one) and the phrase "any solution" means any now known or later developed solution.

Turning to the drawings, FIG. 1 shows an illustrative environment 10 for managing a set of simulations 50 according to an embodiment. To this extent, environment 10 includes a grid infrastructure 12 that can perform the process described herein in order to manage simulation(s) 50, e.g., the concurrent execution of multiple simulations 50. In particular, grid infrastructure 12 is shown including a computing device 14, which comprises a management node, and a set of additional nodes 16 that are operable to concurrently manage a set of simulations 50 by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as interface program 30, which is stored in a storage system, such as memory 22A and/or storage device 22B. While executing program code, processor 20 can read and/or write data to/from memory 22A, storage device 22B, and/or I/O interface 24. Bus 26 provides a communications link between each of the components in computing device 14. I/O device 28 can comprise any device that transfers information between a user 18 and computing device 14. To this extent, I/O device 28 can comprise a user I/O device to enable an individual user 18 to interact with computing device 14 and/or a communications device to enable a system user 18 to communicate with computing device 14 using any type of communications link.

In any event, computing device 14 can comprise any general purpose computing article of manufacture capable of executing program code installed thereon. However, it is understood that computing device 14 and the program code shown thereon are only representative of various possible equivalent computing devices that may perform the process described herein. To this extent, in other embodiments, the functionality provided by computing device 14 and the program code can be implemented by a computing article of manufacture that includes any combination of general and/or specific purpose hardware and/or program code. In each embodiment, the program code and hardware can be created using standard programming and engineering techniques, respectively.

Similarly, grid infrastructure 12 can comprise two or more of any type of computing devices that communicate over any type of communications link, such as a network, a shared memory, or the like, to perform the process described herein. Further, while performing the process described herein, computing devices in grid infrastructure 12 can communicate with one or more other computing devices external to grid infrastructure 12 using any type of communications link. In either case, the communications link can comprise any combination of various types of wired and/or wireless links; comprise any combination of one or more types of networks; and/or utilize any combination of various types of transmission techniques and protocols.

As discussed herein, grid infrastructure 12 is capable of concurrently managing multiple simulations 50. Operation of grid infrastructure 12 is discussed further herein with respect to the program code shown implemented on computing device 14. However, it is understood that some of the functionality can be implemented independently, combined, and/or stored in memory of one or more separate computing devices that are included in grid infrastructure 12. Further, it is understood that some of the functionality may not be implemented, or additional functionality may be included as part of grid infrastructure 12.

Regardless, aspects of the invention provide a solution for managing a set of simulations 50. In an embodiment, grid infrastructure 12 is defined using Globus, or the like. A set of middleware 34 can be implemented in grid infrastructure 12 to provide a level of abstraction of the resources of grid infrastructure 12 for a user 18 and/or simulation 50 executing therein and/or optimize the performance of simulation(s) 50 executing within grid infrastructure 12. In an embodiment, middleware 34 comprises OptimalGrid, which has been developed by International Business Machines Corp. of Armonk, N.Y.

Grid infrastructure 12 includes a plurality of nodes 14, 16. Each node 14, 16 includes a resource allocation management program 32, which can enable simulation(s) 50 to execute in grid infrastructure 12. Node 14 can comprise a management node that includes an interface program 30, which interfaces with the various instances of resource allocation management programs 32 distributed throughout nodes 14, 16. Additionally, grid infrastructure 12 can include a monitoring and discovery service 19 that can execute on one or more nodes 14, 16 and/or on a separate, dedicated node, and which can be consulted by resource allocation management programs 32 to identify and/or allocate available resources within grid infrastructure 12.

FIG. 2 shows an illustrative architecture for deploying simulation 50 to grid infrastructure 12 according to an embodiment. Referring to FIGS. 1 and 2, user 18 can manually or automatically generate a set of requirements for a simulation 50. In an embodiment, the set of requirements are stored in one or more Requirements Specification Language (RSL) eXtensible Markup Language (XML) documents 40, which is/are provided for processing by management node 14 (or another node 16 in grid infrastructure 12 that is executing resource allocation management program 32). Management node 14 can create a virtual grid infrastructure within grid infrastructure 12 for simulation 50 based on the set of requirements.

In particular, management node 14 can assign a set of grid resources (e.g., processing capabilities, storage resources, communications bandwidth, and/or the like) of grid infrastructure 12 to simulation 50 using any solution. Management node 14 can consult monitoring and discovery service 19 to identify a portion of or all of the set of resources. To this extent, monitoring and discovery service 19 may indicate that grid infrastructure 12 does not have sufficient available resources to support simulation 50. In this instance, management node 14 can provide user 18 with an indication that simulation 50 cannot currently execute in grid infrastructure 12.

When sufficient resources are available in grid infrastructure 12, management node 14 can obtain a set of middleware components 34A, which will be utilized in executing simulation 50. In an embodiment, middleware components 34A comprises a standard set of files, executable programs, and/or the like, which can be stored and obtained by management node 14 for each simulation 50. For example, middleware components 34A can include: one or more proxy servers; one or more autonomic program managers (APMs), which coordinate the execution of simulation 50; network middleware, such as TSpaces developed by International Business Machines Corp. of Armonk, N.Y.; one or more agents, such as compute agents that perform the computations for a corresponding simulation 50; a problem builder, which analyzes the problem(s) presented in simulation 50; configuration files; and/or the like. In any event, management node 14 can automatically transfer middleware components 34A to the set of grid resources allocated to simulation 50 using any solution. Management node 14 can use any solution to transfer data between resources of grid infrastructure 12. For example, in an embodiment, management node 14 utilizes a reliable file transfer (RFT) service 36 to manage the transfer of middleware components 34A between the resources.

In any event, management node 14 can obtain a set of simulation elements for simulation 50 and deploy the set of simulation elements to the corresponding middleware components 34A that will be utilized in executing the simulation elements. Management node 14 can obtain and deploy the set of simulation elements using any solution, such RFT service 36. In any event, the set of simulation elements can include simulation content 50A, such as libraries, graphics, sounds, scripts, and/or the like, as well as simulation engine binaries (simulation engines) 50B. Management node 14 can deploy each simulation engine binary 50B and corresponding simulation content 50A to a corresponding middleware component 34A, such as a compute agent, for execution. In an embodiment, simulation engine binaries 50B includes a main execution file (e.g., "mission" file) that management node 14 can deploy to a node 16 having specialized capabilities, such as the problem builder. The main execution file can be defined using any file storage solution, such as a binary space partitioning (BSP) tree, or the like.

After management node 14 has generated the virtual grid infrastructure for simulation 50 within grid infrastructure 12, grid infrastructure 12 can mange the execution of simulation 50. During the execution of simulation 50, one or more simulation clients 60 can interact with simulation 50. Since simulation 50 is executed using a designated subset of grid resources and middleware 34, grid infrastructure 12 can support concurrently managing multiple distinct simulations 50 and the executions thereof. To this extent, a number of simulations 50 supported by grid infrastructure 12 will only be limited by an amount of grid resources in grid infrastructure 12 and the amount of grid resources required for each simulation 50.

To this extent, FIG. 3 shows an illustrative architecture for executing multiple simulations 50A-B in grid infrastructure 12 according to an embodiment. While two simulations 50A-B are shown, it is understood that any number of simulations can be concurrently executed in grid infrastructure 12. As illustrated, each simulation 50A-B can be executed within a virtual grid infrastructure 70A-B, which comprises a unique set of grid resources as the other virtual grid infrastructure 70A-B. In this case, each virtual grid infrastructure 70A-B can include various components, which collectively form the execution environment for the corresponding simulation 50A-B. For example, each virtual grid infrastructure 70A-B is shown including a problem builder with main execution file component 72A-B, a compute agents with simulation engines component 74A-B, an autonomic program manager component 76A-B, a network middleware component 78A-B (e.g., TSpaces), and a proxy server component 80A-B. Each component can comprise one or more grid resources, a set of middleware component(s), and/or a set of simulation element(s), which are executed to perform the desired functionality.

Using virtual grid infrastructure 70A as an illustrative implementation, management node 14 can execute problem builder with main execution file component 72A, which can initialize simulation 50A for execution. For example, problem builder with main execution file component 72A can use the main execution file for simulation 50A to partition simulation 50A into areas for hosting on the various compute agents with simulation engines components 74A. Subsequently, management node 14 can execute a launch sequence for the implementation of middleware 34 in virtual grid infrastructure 70A. The launch sequence can start the middleware processes on the node(s) 16 provisioned for virtual grid infrastructure 70A. For example, each problem builder with main execution file component 72A, APM component 76A, network middleware component 78A, and/or proxy server component 80A can be started. After execution is started, simulation client(s) 60A can connect to simulation 50A view proxy server(s) 80A and interact with simulation 50A.

During the execution of simulation 50A, proxy server 80A can receive input (e.g., actions) from simulation client(s) 60A. Based on the input, proxy server 80A can reconfigure compute agents with simulation engines component 74A. In particular, proxy server 80A can reroute a simulation engine executing in a compute agent based on the input. Proxy server 80A can obtain direction for the rerouting from APM component 76A. In this manner, compute agents with simulation engines component 74A can comprise a dynamically configurable component.

The creation of a virtual grid infrastructure 70A-B and execution of a simulation 50A-B within the virtual grid infrastructure 70A-B can be repeated to concurrently manage any number of additional simulations 50A-B. For each simulation 50A-B, the corresponding simulation clients 60A-B interact with the simulation 50A-B using the corresponding proxy server 80A-B.

Additionally, grid infrastructure 12 can halt execution of a simulation 50A-B. For example, management node 14 can request that all middleware 34 processes stop executing for the corresponding simulation 50A-B on the corresponding node(s) 16. In this case, management node 14 can identify the middleware 34 processes using any solution. In one embodiment, a job handle is created when the middleware 34 processes are started, and is used by management node 14 to request that the middleware 34 processes stop. In any event, the processes associated with the various components in the corresponding virtual grid infrastructure 70A-B will terminate, while the processes associated with other virtual grid infrastructures, if any, will remain unaffected. Further, grid infrastructure 12 can un-assign the grid resources assigned to virtual grid infrastructure 70A-B. For example, management node 14 can request that each node 16 remove all artifacts (e.g., files, logs, and/or the like) of the middleware 34 from each node 16, remove all artifacts of simulation 50 from each node 16, and/or the like.

In an illustrative embodiment, each simulation 50A-B comprises a virtual world. In this case, virtual grid infrastructures 70A-B can correspond to a virtual world instance and/or a type of the virtual world. To this extent, each virtual world instance/type can be deployed and managed using a cohesive, consolidated set of tools and methods. Further, the execution of each instance/type can perform autonomic load balancing (e.g., using the corresponding APM components 76A-B) and virtualization (e.g., using middleware 34). As a result, a hosting provider for the virtual worlds can optimize the use of grid resources for grid infrastructure 12, increase options for virtual world types/sizes, efficiently manage grid infrastructure 12, and/or the like.

While shown and described herein as a method and system for managing simulation(s) in a grid infrastructure, it is understood that the invention further provides various alternative embodiments. For example, in one embodiment, the invention provides a computer program stored on a computer-readable medium, which when executed, enables a computer system to manage simulation(s) in a grid infrastructure. To this extent, the computer-readable medium includes program code, such as resource allocation management program 32 (FIG. 1) and/or middleware 34 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied: on one or more portable storage articles of manufacture; on one or more data storage portions of a computing device, such as memory 22A (FIG. 1) and/or storage system 22B (FIG. 1); within a data signal traveling over a network (e.g., during a wired/wireless electronic distribution of the computer program); on paper (e.g., capable of being scanned and converted to electronic data); and/or the like.

In another embodiment, the invention provides a method of generating a system for managing simulation(s) in a grid infrastructure. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

Further, it is understood that embodiments of the invention can be implemented as part of a business method that performs the process described herein on a subscription, advertising, and/or fee basis. That is, a service provider could offer to manage simulation(s) in a grid infrastructure as described herein. In this case, the service provider can manage (e.g., create, maintain, support, etc.) a computer system, such as computer system 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing a set of simulations within a grid infrastructure, the method comprising:
    creating, using a computing device, a plurality of virtual grid infrastructures within the grid infrastructure, wherein one of the plurality of virtual grid infrastructures is created for each simulation of the set of simulations, each simulation comprising a virtual world, the creating including:
        assigning a set of grid resources of the grid infrastructure to each simulation;
        detecting a sufficient available amount of the set of grid resources for each simulation within the grid infrastructure;
        deploying a set of executable middleware components to the assigned set of grid resources in response to detecting the sufficient amount of the set of grid resources; and
        deploying a set of simulation elements for each simulation to the set of executable middleware components, wherein the set of simulation elements, the set of executable middleware components, and the set of grid resources form the virtual grid infrastructure for each simulation; and
    executing the set of simulation elements within the set of grid resources using the set of executable middleware components.

2. The method of claim 1, the assigning including consulting a monitoring and discover service to identify at least a portion of the set of resources.

3. The method of claim 1, the set of executable middleware components including a problem builder and a set of compute agents.

4. The method of claim 3, the set of simulation elements including a main execution file, the deploying the set of simulation elements including deploying the main execution file to the problem builder.

5. The method of claim 3, the set of simulation elements including a set of simulation engines, the deploying the set of simulation elements including deploying a simulation element in the set of simulation elements to a compute agent.

6. The method of claim 1, the set of executable middleware components including a proxy server that enables a simulation client to interact with each simulation.

7. The method of claim 6, the executing including managing a set of user connections for the simulation using the proxy server, the managing including:
    obtaining a user action;
    receiving a program action based on the user action; and
    rerouting a simulation engine executing in a compute agent based on the program action.

8. The method of claim 1, further comprising concurrently executing a second simulation in the grid infrastructure.

9. A system for managing a set of simulations within a grid infrastructure, the system comprising:
    a computing device including:
        a system for creating a plurality of virtual grid infrastructures within the grid infrastructure, wherein one of the plurality of virtual grid infrastructures is created for each simulation of the set of simulations, each simulation comprising a virtual world, the system for creating including:
        a system for assigning a set of grid resources of the grid infrastructure to each simulation;
        a system for detecting a sufficient available amount of the set of grid resources for each simulation within the grid infrastructure;
        a system for deploying a set of executable middleware components to the assigned set of grid resources in response to detecting the sufficient amount of the set of grid resources; and
        a system for deploying a set of simulation elements for each simulation to the set of executable middleware components, wherein the set of simulation elements, the set of executable middleware components, and the set of grid resources form the virtual grid infrastructure for each simulation; and a system for executing the set of simulation elements within the set of grid resources using the set of executable middleware components.

10. The system of claim 9, the system for assigning including a system for consulting a monitoring and discover service to identify at least a portion of the set of resources.

11. The system of claim 9, the set of executable middleware components including a proxy server that enables a simulation client to interact with each simulation.

12. The system of claim 9, further comprising a system for concurrently executing a second simulation in the grid infrastructure.

13. The system of claim 9, further comprising:
a system for halting execution of the set of simulation elements; and
a system for un-assigning the set of grid resources.

14. A non-transitory computer-readable storage medium storing program code, which when executed, enables a computer system to implement a method of managing a set of simulations within a grid infrastructure, the method comprising:
creating a plurality of virtual grid infrastructures within the grid infrastructure, wherein one of the plurality of virtual grid infrastructures is created for each simulation of the set of simulations, each simulation comprising a virtual world, the creating including:
assigning a set of grid resources of the grid infrastructure to each simulation;
detecting a sufficient available amount of the set of grid resources for each simulation within the grid infrastructure;
deploying a set of executable middleware components to the assigned set of grid resources in response to detecting the sufficient amount of the set of grid resources; and
deploying a set of simulation elements for each simulation to the set of executable middleware components, wherein the set of simulation elements, the set of executable middleware components, and the set of grid resources form the virtual grid infrastructure for each simulation; and
executing the set of simulation elements within the set of grid resources using the set of executable middleware components.

15. A non-transitory computer-readable storage medium of claim 14, the assigning including consulting a monitoring and discover service to identify at least a portion of the set of resources.

16. A non-transitory computer-readable storage medium of claim 14, the set of executable middleware components including a proxy server that enables a simulation client to interact with each simulation.

17. A non-transitory computer-readable storage medium of claim 16, the executing including managing a set of user connections for the simulation using the proxy server, the managing including:
obtaining a user action;
receiving a program action based on the user action; and
rerouting a simulation engine executing in a compute agent based on the program action.

18. A non-transitory computer-readable storage medium of claim 14, the method further comprising concurrently executing a second simulation in the grid infrastructure.

19. A method of generating a system for managing a set of simulations within a grid infrastructure, the method comprising:
providing a computer system configured to:
create a plurality of virtual grid infrastructures within the grid infrastructure, wherein one of the plurality of virtual grid infrastructures is created for each simulation of the set of simulations, each simulation comprising a virtual world, the creating including:
assigning a set of grid resources of the grid infrastructure to each simulation;
detecting a sufficient available amount of the set of grid resources for each simulation within the grid infrastructure;
deploying a set of executable middleware components to the assigned set of grid resources in response to detecting the sufficient amount of the set of grid resources; and
deploying a set of simulation elements for each simulation to the set of executable middleware components, wherein the set of simulation elements, the set of executable middleware components, and the set of grid resources form the virtual grid infrastructure for each simulation; and
execute the set of simulation elements within the set of grid resources using the set of executable middleware components.

20. The method of claim 19, the computer system being further operable to concurrently execute a second simulation in the grid infrastructure.

* * * * *